United States Patent [19]

Wickerson

[11] Patent Number: 4,948,338

[45] Date of Patent: Aug. 14, 1990

[54] TURBINE BLADE WITH COOLED SHROUD ABUTMENT SURFACE

[75] Inventor: Brian J. Wickerson, Derby, England

[73] Assignee: Rolls-Royce plc, London, England

[21] Appl. No.: 396,058

[22] Filed: Aug. 21, 1989

[30] Foreign Application Priority Data

Sep. 30, 1988 [GB] United Kingdom ............... 8823022

[51] Int. Cl.$^5$ ........................... F01D 5/22; F01D 5/18
[52] U.S. Cl. .................................... 416/92; 416/190; 416/189
[58] Field of Search ................. 416/189 R, 92, 190, 416/191

[56] References Cited

U.S. PATENT DOCUMENTS

| | | | |
|---|---|---|---|
| 3,182,955 | 5/1965 | Hyde | 416/191 X |
| 3,527,544 | 9/1970 | Allen | 416/191 |
| 3,576,377 | 4/1971 | Beanland et al. | 416/190 |
| 3,606,574 | 9/1971 | Brands et al. | 416/191 X |
| 3,816,022 | 6/1974 | Day | 416/191 X |
| 3,876,330 | 4/1975 | Pearson et al. | 416/92 |
| 4,127,358 | 11/1978 | Parkes | 416/92 X |
| 4,177,011 | 12/1979 | Eskesen et al. | 416/191 |

FOREIGN PATENT DOCUMENTS

| | | | |
|---|---|---|---|
| 47104 | 3/1983 | Japan | 416/92 |
| 584580 | 1/1947 | United Kingdom | 416/191 |
| 811921 | 4/1959 | United Kingdom | 416/191 |
| 938139 | 9/1961 | United Kingdom . | |
| 1322302 | 8/1970 | United Kingdom . | |
| 1276200 | 6/1972 | United Kingdom | 416/92 |
| 1285369 | 8/1972 | United Kingdom | 416/92 |
| 1426049 | 2/1976 | United Kingdom | 416/191 |
| 1514613 | 4/1976 | United Kingdom . | |
| 1516757 | 9/1976 | United Kingdom . | |
| 1650220 | 10/1976 | United Kingdom . | |
| 1572410 | 4/1977 | United Kingdom . | |

Primary Examiner—Edward K. Look
Assistant Examiner—Hoang Nguyen
Attorney, Agent, or Firm—Cushman, Darby & Cushman

[57] ABSTRACT

A turbine aerofoil blade is provided with a shroud member at its radially outer extent for engagement with the corresponding shroud members of adjacent aerofoil blades. A cooling air duct within the shroud member directs cooling air to the abutment region of the shroud member so as to provide impingement cooling thereof. Ports provided in the cooling air duct direct a flow of cooling air from the duct over the outer surface of the abutment region so as to provide additional cooling thereof.

12 Claims, 3 Drawing Sheets

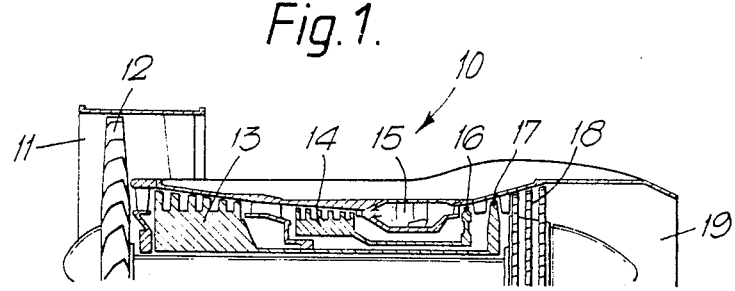
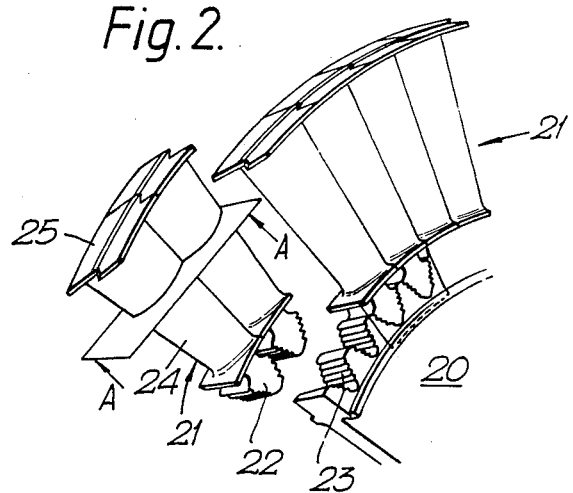
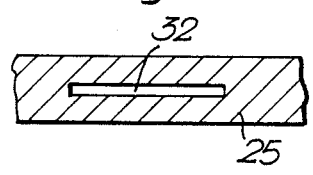
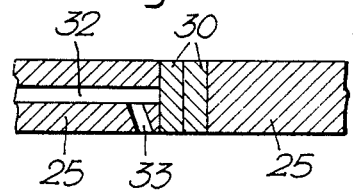

TURBINE BLADE WITH COOLED SHROUD ABUTMENT SURFACE

This invention relates to a turbine aerofoil blade and in particular to a shrouded turbine aerofoil blade for use in an axial flow turbine.

The efficiency of axial flow turbines is, inter alia, dependent upon the clearance between the radially outer extents of its turbine aerofoil rotor blades and the casing which normally surrounds them. If the clearance is too great, gas leakage occurs across the gap between them, thereby lowering turbine efficiency. However if the clearance is too small, there is a danger that under certain circumstances, damaging contact could occur between the blades and casing.

One way of reducing this leakage is to provide each of the turbine aerofoil blades with a shroud member at its radially outer extent. The shroud members of adjacent turbine aerofoil blades cooperate to define an annular barrier to the gas leakage flow.

In order to provide an effective gas leakage barrier, and minimise aerofoil blade vibration problems, steps are taken to ensure that adjacent shroud members abut each other so that they cooperate to define a rigid annular structure. This necessitates the provision of a hard, wear resistant alloy coating on abutting shroud surfaces. However in practice it is sometimes found that such coatings tend to get very hot and this can lead to both their creep extrusion as a result of centrifugal loading and their burning. Both effects can lead to the appearance of gaps between adjacent shrouds so that turbine efficiency drops as a result of gas leakage through the gaps and blade vibration problems can occur.

It is an object of the present invention to provide a shrouded turbine aerofoil blade having a hard wear resistant alloy coating on its abutment surfaces which coating is arranged to be cooled during turbine operation so as to minimise creep extrusion and burning problems.

According to the present invention, a turbine aerofoil blade is provided at one of its extents with means for its attachment to the periphery of a rotatable disc and at its opposite extent with a shroud member, said shroud member being provided with portions having surfaces adapted to abut corresponding surfaces on corresponding portions of the shroud members of similar operationally adjacent turbine aerofoil blades, at least one of said abutment portions being interconnected with a source of cooling fluid by duct means located internally of said shroud member, said duct means being partially defined by said at least one abutment portion so that in operation, the flow of cooling fluid through said duct means provides cooling of said abutment portion, said duct means additionally being provided with at least one cooling fluid exhaust port so located and configured as to exhaust said cooling fluid from said duct means in such a direction as to provide a flow of said cooling fluid over an external region of said at least one abutment portion to provide additional cooling of said abutment portion.

The invention will now be described, by way of example, with reference to the accompanying drawings in which FIG. 1 is a sectioned side view of the upper half of a ducted fan gas turbine engine having a turbine which includes aerofoil blades in accordance with the present invention.

FIG. 2 is an exploded view of a portion of the turbine of the ducted fan gas turbine engine shown in FIG. 1.

FIG. 4 is a view on the section line B—B of FIG. 3.

FIG. 5 is a view on the section line C—C of FIG. 3.

Figure 3:
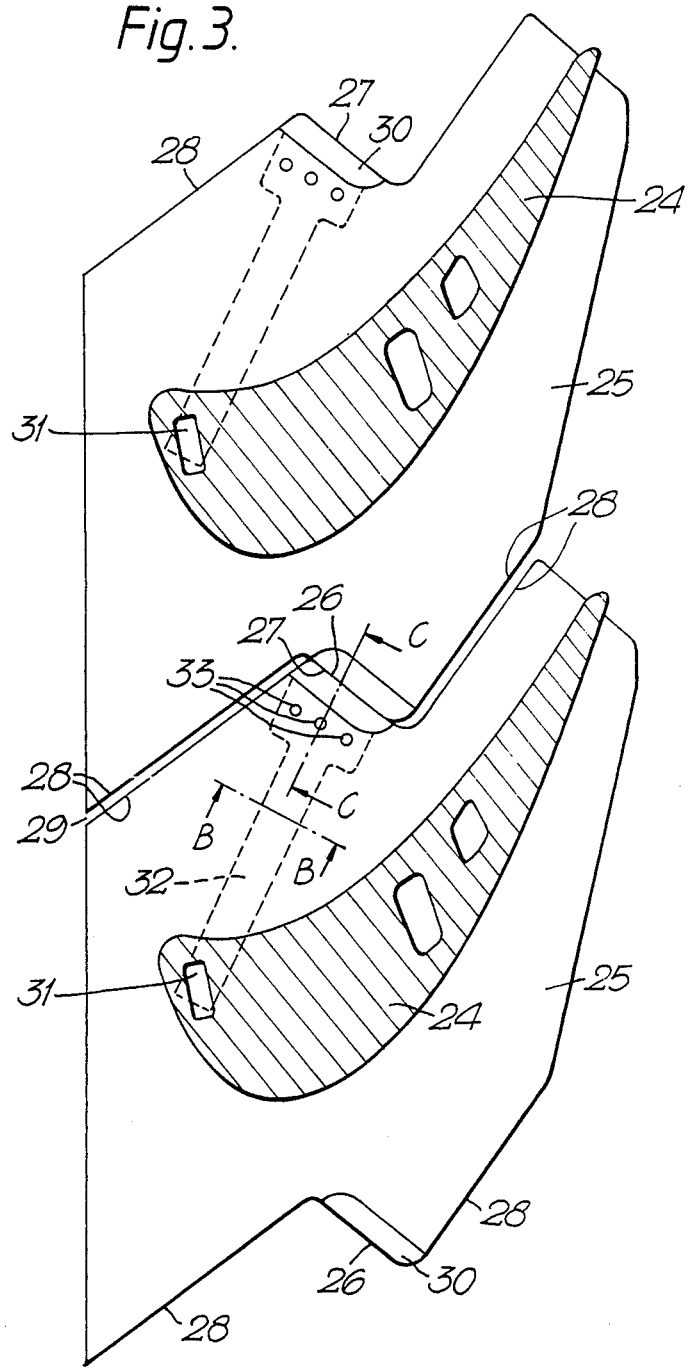
FIG. 3 is a view on the section plane A—A shown in FIG. 1.

With reference to FIG. 1, a ducted fan gas turbine engine generally indicated at 10 is of conventional layout and comprises, in axial flow series, an air intake 11, a fan 12, intermediate and high pressure compressors 13 and 14, combustion equipment 15, high, intermediate and low pressure turbines 16,17 and 18 which are respectively interconnected with the high and intermediate pressure compressors 14 and 13, and the fan 12, and finally on exhaust nozzle 19. The engine 10 functions in the conventional manner whereby air drawn in through the intake 11 is divided into two flows: one to provide propulsive thrust and the other directed into the intermediate pressure compressor 13. The air from the intermediate pressure compressor 13 is further compressed by the high pressure compressor 14 before being mixed with fuel and the mixture combusted in the combustion equipment 15. The resultant exhaust gases then expand through and drive the high, intermediate and low pressure turbines 16,17 and 18 before being exhausted through the exhaust nozzle 19 to provide additional propulsive thrust.

A portion of the rotor stage of the high pressure turbine 16 can be seen more easily if reference is made to FIG. 2. The rotor stage comprises a disc 20 having a plurality of radially extending aerofoil blades 21 mounted around its periphery. Each aerofoil blade 21 has at its radially inner extent a root portion 22 of the so-called fir-tree cross-sectional shape which locates within a correspondingly shaped slot 23 provided in the disc 20 periphery so as to anchor the blade 21 to the disc 20. An aerofoil cross-section portion 24 extends from the root portion 22 and terminates in a shroud member 25. The shroud members 25 of the aerofoil blades 21 cooperate in the manner shown in FIG. 2 to define an annular shroud which in turn serves to define a portion of the radially outer extent of the exhaust gas passage through the high pressure turbine 16.

The structure of the shroud members 25 can be seen more clearly if reference is made to FIG. 3. Each shroud member 25 has two circumferentially spaced apart parallel faces 26 and 27 which are positioned so as to abut the corresponding faces 26 and 27 on adjacent shroud members 25.

The faces 26 and 27 are axially angled and generally normal to the remainder of the circumferential shroud member extents 28. Moreover, the shroud member extents 28 are so arranged that a small gap 29 is defined between the circumferential extents 28 of adjacent shroud members 25.

The shroud member abutment faces 26 are defined by a coating 30 of an alloy which is harder than the remainder of the shroud member 25 so as to be capable of withstanding their abutment with adjacent faces 26.

In order to ensure that the coatings 30 are maintained at an acceptably low temperature during engine operation, they are arranged to be cooled by a flow of cooling air tapped from a cooling air passage located within the blade aerofoil portion 24. More specifically one of the coatings 30 on each shroud member 25 is interconnected with a cooling air passage 31 located within the blade aerofoil portion 24 by means of a duct 32 which is located within and defined by the shroud member 25.

The cooling air passage 31 within the aerofoil portion is one which is normally present within the aerofoil portion 24 to provide cooling thereof and is supplied with air from the intermediate pressure compressor 13 in the conventional manner.

The duct 32, which is, as can be seen from FIG. 4, of rectangular cross-sectional shape, is produced by the technique known as electro-discharge machining prior to the application, by for instance welding, of the hard alloy coating 30 to the shroud member 25. During the initial stages of the electro-discharge machining operation, the machining electrode is oscillated so as to enlarge the cross-sectional area of the duct 32 in the region of the coating 30. This is to ensure that as much as possible of the coating 30 is exposed to the interior of the duct 32. It will be seen therefore that although the majority of the duct 32 is defined by the shroud member 25 in which it is located a portion of the duct 25 is defined by the coating 30.

In operation, cooling air from the aerofoil portion passage 31 flows into the duct 32 and into engagement with the coating 30, thereby providing impingement cooling of the coating 30 and in turn conductive cooling of the abutting coating 30 of the adjacent shroud member 25. The cooling air then exhausts from the duct 32 through three ports provided in the radially inner face of the shroud member 25 adjacent to the coating 30. The ports 33 are angled as can be seen in FIG. 5 so that the exhausted cooling air flows over part of the exterior of the coating 30 and also over the part of the exterior of the abutting coating 30 on the adjacent shroud member 25, thereby providing film cooling of both coatings 30.

It will be seen therefore that each of the cooling air ducts 32 provides cooling of both the coating 30 with which it is associated and the abutting coating 30 of the adjacent shroud portion 25. This being so although each of the shroud members 25 is provided with two abutment faces 26 on opposite circumferential extents thereof, only one cooling air duct 32 is necessary within each shroud member 25 to provide effective cooling of those faces 26. It may be desirable however under certain circumstances to provide two cooling air ducts 32 within each of the shroud portions 25 in order to provide a cooling air flow to both of the abutment surfaces 26 on the shroud member 25.

Thus the coatings 30 on the shroud members 25 are each effectively cooled, thereby reducing the likelihood of either creep extrusion or burning of those coatings 30.

I claim:

1. A turbine aerofoil blade provided at one of its extents with means for its attachment to the periphery of a rotatable disc and at its opposite extent with a shroud member, said shroud member being provided with portions having surfaces which are adapted to abut corresponding surfaces on corresponding portions of the shroud members of similar operationally adjacent turbine aerofoil blades, duct means interconnecting at least one of said abutment portions with a source of cooling fluid, said duct means being located internally of said shroud member, and partially defined by at least one abutment portion so that in operation, the flow of cooling fluid through said duct means provides cooling of said abutment portion, said duct means additionally being provided with at least one cooling fluid exhaust port so located and configured as to exhaust said cooling fluid from said duct means in such a direction to provide a flow of said cooling fluid over an external region of said at least one abutment portion to provide additional cooling of that abutment portion.

2. A turbine aerofoil blade as claimed in claim 1 wherein said blade is provided with a cooling fluid passage extending lengthwise thereof to provide cooling thereof, said cooling fluid passage being in flow communication with said duct means to thereby constitute said source of cooling fluid.

3. A turbine aerofoil blade as claimed in claim 1 wherein said abutment surfaces constitute only part of the confronting surfaces of adjacent shroud members.

4. A turbine aerofoil blade as claimed in claim 1 wherein the portion of said duct means not defined by said abutment portion is defined by said shroud member.

5. A turbine aerofoil blade as claimed in claim 1 wherein said at least one cooling fluid exhaust port is provided on the radially inner surface of said shroud member.

6. A turbine aerofoil blade as claimed in claim 1 wherein said shroud member is provided with two abutment surfaces, one on each circumferential extent of said shroud member.

7. A turbine aerofoil blade as claimed in claim 1 wherein said cooling fluid is air.

8. A turbine blade, comprising:
surface means for directing air downstream into a turbine engine, the surface means having a first end and a second end;
means for attaching the first end of the surface means to the periphery of a rotatable disc;
said turbine blade also including a shroud member comprising:
an inside wall and an outside wall, the inside wall being attached to the second end of the surface means;
first and second abutment surfaces, each being adapted to abut to a corresponding abutment surface of an adjacent turbine blade when said blades are mounted on a disc;
duct means, located inside the shroud member, for interconnecting the first abutment surface with a source of cooling fluid so that the first abutment surface is cooled from the inside of the shroud member;
said duct means having at least one exhaust port leading through the inside wall of the shroud member for allowing cooling fluid from the duct means inside the shroud member to exit the shroud member and flow over an external region of the first abutment surface and its corresponding abutment surface, the exhaust ports being located upstream of the abutment surface, with the external flow of cooling fluid cooling both the fist abutment surface and its corresponding abutment surface from outside the shroud member.

9. The turbine blade of claim 8 wherein first and second abutment surfaces are made of hard alloys, the abutment surfaces being welded to the shroud member.

10. The turbine blade of claim 8 wherein exhaust ports are located in a line which is parallel to the first abutment surface, each exhaust port being located close to the first abutment surface so that the full length of the inside edge of first abutment surface is supplied with cooling fluid.

11. The turbine blade of claim 8 wherein the exhaust ports leading through the inside wall of the shroud member are angled toward the first abutment surface.

12. The turbine blade of claim 10 wherein the exhaust ports leading through the inside wall of the shroud member are angled toward the first abutment surface.

* * * * *